United States Patent Office 2,780,493
Patented Feb. 5, 1957

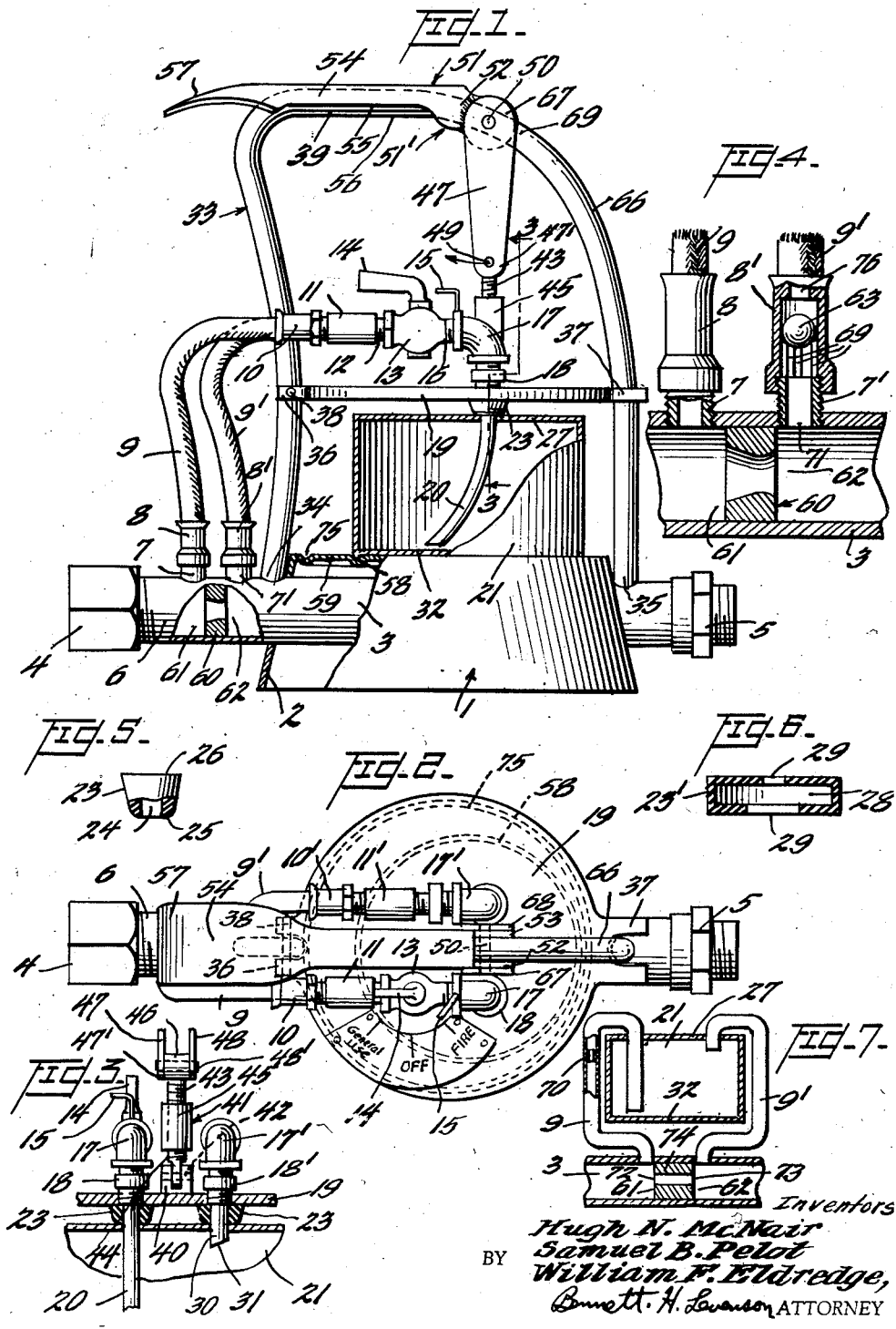

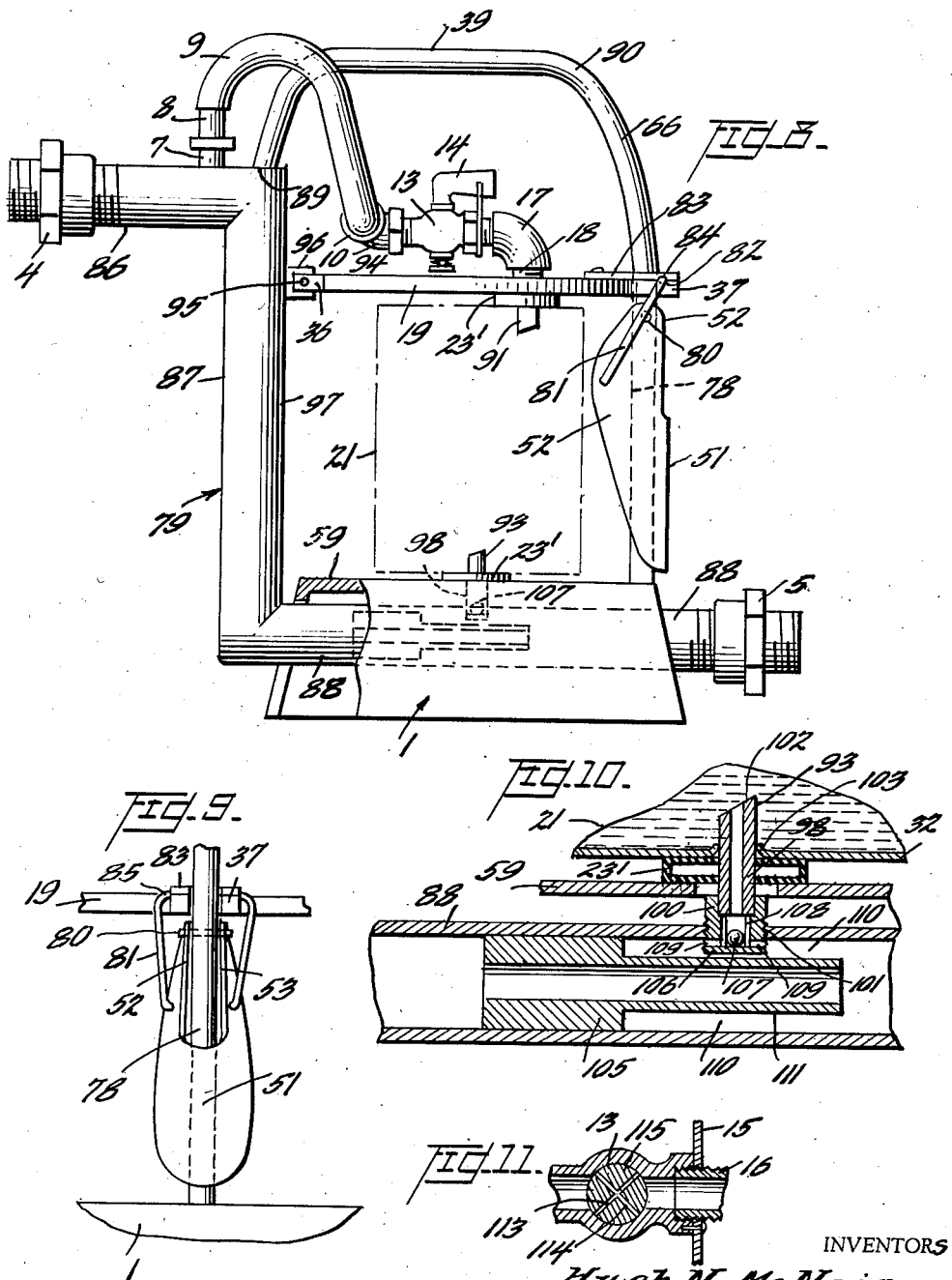

2,780,493

FLUID PROPORTIONING DEVICE

Hugh N. McNair, Navesink, N. J., and Samuel B. Pelot and William F. Eldredge, Miami, Fla.

Application November 25, 1950, Serial No. 197,618

14 Claims. (Cl. 299—84)

This invention relates to the art of disseminating fluids, and is especially applicable to dispensing, by the inclusion within a flowing vehicle, of substantially controlled amounts of a material which may be soluble, emulsive or dispersible within the vehicle. More particularly it pertains to the distribution of liquids in any expedient manner, such as by sprinkling, spraying, diffusing, in the form of a solid stream, or otherwise, while incorporating and admixing within a flowing stream of the liquid, proportioned quantities of a reagent or chemical substance. In its preferred adaptation, the invention is directed to the proportioned, automatic incorporation and admixture of a water-soluble, emulsive, or dispersible chemical substance, desirably in liquid state, within a flowing stream of water as the vehicle, the resultant combination being adapted for any practical manner of distribution, as above indicated, pursuant to its predetermined field of usage.

Various devices have been available for dispensing materials together with or as an ingredient of a fluid stream, such as a liquid vehicle. While some of these devices have afforded an element of effectiveness, they have generally manifested various difficulties and objectionable characteristics.

In brief, the structures of the prior art have not lent themselves to a flexibility of adaptation, either from the standpoint of portability, facility of charging or replenishing with chemical substance to be dispensed, or with respect to efficient functioning over a wide range of flows, pressures, and back pressures.

It is an object of this invention to obviate such difficulties and uncertainties as hereinabove indicated.

Another object is to attain a compact, efficient device for automatically proportioning a chemical substance with a flowing liquid vehicle, such device being an integral structure essentially free from permanent attachments which necessitate dismantling for purposes of recharging or replenishing the chemical substance.

An additional object of the invention comprises a compact, simplified, integral, sturdy structure for automatically proportioning and admixing a chemical substance in a flowing stream of liquid vehicle, such as water, wherein the container of the chemical substance is expeditiously replaceable essentially without the necessity for any dismantling, and even without interruption to flow of vehicle, if desired.

A significant object is a compact, efficient, sturdy, integral device for providing a proportioned admixture of chemical substance and flowing liquid vehicle, wherein the container of the chemical substance is expendable and expediently replaceable.

Another important object is to devise an integral, compact, sturdy device adapted for providing a proportioned admixture of a chemical substance with a flowing stream of liquid vehicle, such as water, said device being essentially portable and extremely flexible in its efficient operation under widely diversified conditions, such as variations of flows, pressures and back pressures, as well as variations in locus of operation.

Other objects, advantages, and features of the invention will become apparent from the following description read in connection with the accompanying drawings, wherein similar elements are designated by like numerals:

Fig. 1 is an elevational view of a preferred embodiment of the device, the container of the chemical substance being shown in section, and the conduit for the principal flow of vehicle being partially broken away at the zone of restricted passage therein.

Fig. 2 comprises a plan view of the device indicated by Fig. 1.

Fig. 3 relates to a side elevational view of the conduit fittings, affixed to the plate of the device, through which a by-pass portion of liquid vehicle in controlled quantity flows into the chemical container, and whereby the chemical substance passes from the container into the flowing stream of vehicle.

Fig. 4 is drawn to a fragmentary vertical section axially of the conduit for the main flow of vehicle, showing the coordination of the by-pass and return flow conduit with the flow restricting means in said main flow conduit.

Fig. 5 presents a detail view, partly in section, of an effective and desirable gasket adapted for positioning between the plate of the device and the chemical container, at the opening in the latter.

Fig. 6 is another novel embodiment, shown in section, of a quite satisfactory gasket applicable to the conditions prevailing between the plate and the chemical container, at the opening in the latter.

Fig. 7 pertains to a diagrammatic sectional view indicative of fundamentals applicable to proportioning features of the invention, and including a modification of flow restricting means in the principal conduit of vehicle flow.

Fig. 8 is directed to another modification of the invention, embodying the fundamentals of the device shown in Figs. 1–4, and differing as to details of structure.

Fig. 9 comprises an elevational detail of locking clamp coordinated with the carrying frame, as shown in the modification of Fig. 8.

Fig. 10 presents in sectional view another modification of restricted passage within the conduit of main vehicle flow, together with the attendant coordination therewith of the conduit for effecting the supply of chemical substance from the container to the vehicle.

Fig. 11 indicates in sectional detail a desirable valve control means for regulating the by-pass flow of liquid vehicle from the main stream to the chemical container, and is applicable to either of the illustrative embodiments of the invention shown in Figs. 1 and 8.

Referring more particularly to the features of invention embodied in the modifications shown by the various figures of the drawings, the hollow base 1 may comprise the supporting structure for the complete integral device. Thus through the side walls 2 thereof, which may be in the form of a perimetric apron, desirably passes a conduit 3 through which the principal flow of liquid vehicle is effected. Thus where the vehicle utilized is water, the flow through the said pipe 3 may be that obtained from any household tap or faucet at prevailing pressures, or from any other suitable outlet supplying water under pressure. Desirably pipe 3 is provided with a female hose fitting 4 at one end thereof, with a male hose fitting 5 at the opposing end.

Through the expedient of these fittings, it will be seen that the integral device may be supplied with water by attaching a garden hose of any length to fitting 4, the said hose extending to the tap, faucet or other means connected with the source of water supply. Similarly another flexible hose is subject to attachment at one end thereof to fitting 5, while the other end of the said hose may be supplied with a nozzle or other device for sprinkling, spraying, diffusing, or otherwise distributing or applying the liquid effluent from the said conduit or pipe 3. It will be understood that the nozzle may be of a conventional or specially designed type, the latter being illustrated by means adapted for foam generation.

On the intake side 6 of conduit 3, there is shown a nipple 7, with nipple attachment 8 affixed thereto, such as by a threaded coordination or in any other expedient manner. The said nipple attachment is desirably integral with flexible conduit 9, which may likewise be provided with a similar nipple attachment 10 at its other extremity. It will be understood that the said conduit 9 may be of any commercially available material, such as the neoprene type, and may desirably be transparent. The attachment 10 is shown affixed to coupling 11, by a threaded engagement, and the opposing end of the said member 11 may similarly be in threaded coordination with nipple 12 of selector valve or petcock 13.

The said valve or petcock 13 is provided with a handle or adjusting member 14, and is adapted to regulate the flow of liquid therethrough. Thus petcock 13 may in effect be provided with a plurality of orifice passages of differentiated dimensions, in order to effect a controlled variation in the flow of by-pass or diverted liquid vehicle, such as water, through conduit 9 and the said valve 13, into the chemical container. Alternatively valve 13 may be of the needle controlled type, and in effect any preferred valve means adapted to afford a regulated flow through the valve may be utilized.

As an expedient for aiding in the adjustment of said selector valve 13, through the manipulation of member 14, an upwardly extending stop element 15 is shown. Thus the positioning of member 14 in contact with stop 15 will align an orifice passage of predetermined dimension, within selector valve 13, with the flow of fluid through the by-pass or take-off conduit 9. In this connection, any desirable type of graduated or calibrated device may be utilized for designating the regulation, concentration or field of adaptation applicable to a given positioning of handle 14. Illustratively there is shown in Fig. 2 a polished metal plate 98 affixed to plate 19 and provided with appropriate indicia. It is merely necessary to position valve member 14 over the predetermined indicia or line calibration on plate 98 to attain the desired concentration of chemical substance, the accurate setting of member 14 being facilitated by the reflective characteristics of said plate 14. It will however be understood that supplementary, as well as different means may be resorted to for the purpose of setting handle 14 at one of the various predetermined orifice passages afforded by the selector valve, or for entirely closing the valve, as may be desired.

The outlet end 16 of valve 13 is shown affixed to an elbow fitting 17, desirably by a threaded attachment between the two elements. Similarly the said elbow 17 may be threaded at its other end to a nipple fitting 18 which is permanently affixed in any expedient manner, as by threaded coordination, with plate 19. Integrally coordinated with fitting 18, at the end thereof extending through said plate 19, there is provided a preferred embodiment of combined conduit and puncturing device 20. It will be seen that the said member 20 is in the form of a saber-tooth knife-edged device adapted for puncturing container 21. The said container 21, which is the subject of further consideration hereinbelow, is desirably fabricated from an expendable material, and is preferably a commercially available type of sealed container, prior to its inclusion as an integral member of the apparatus combination, with the contents therein comprising the chemical substance or reagent contemplated for distribution through and/or in admixture with a flowing stream of predetermined vehicle, such as water.

Fitted over the combined conduit and puncturing device 20, there is provided a sealing gasket 23 of expedient form adapted to provide an effective closure peripherally of the opening in the surface of container 21 through which conduit 20 passes, when the said container is coordinated with the apparatus. The gasket may be of any type and material which affords the requisite sealing function for preventing leakage from container 21, when the apparatus is appropriately assembled, with the gasket subject to the conditions of pressure prevailing between plate 19 and the surface of the container 21.

The return flow from container 21 back to conduit 3 is in substantial respect attained through conduits and fittings more or less similar to those indicated hereinabove with respect to the take-off or by-pass line of flow. Thus threaded nipple 7' of conduit 3 is affixed to nipple attachment 8', the latter being permanently combined with flexible conduit 9', which is provided at its other end with nipple attachment 10'. Likewise the said nipple attachment 10' of conduit 9' is affixed to coupling 11', which in turn is directly connected with elbow fitting 17', the respective attachments being by a threaded engagement or in any other expedient manner. The said fitting 17' is coordinated with nipple 18', the latter being affixed to plate 19, and the respective jointure of these elements may also be attained by a threaded relationship or by any other desired expedient. As in the case of conduit 9, conduit 9' may be of any desired material fabrication and is desirably transparent.

Within the nipple attachment 8', means are provided for the directional control of flow through conduit 9'. Thus a check valve 63 is appropriately seated therein to permit the flow of chemical substance from the container 21 into conduit 3, but to prevent any flow reversal from the said conduit through attachment 8' and conduit 9' into the container, as well as to inhibit any flow of vehicle through conduit 9' when there is no container embodied in the device and the vehicle, such as water, is passing through said main flow conduit 3. Thus the check valve contributes to the flexible adaptation of the apparatus in facilitating the replacement of the container with its contents of chemical substance without interrupting the operation of the main flow of fluid in conduit 3.

A combined conduit and puncturing device 30 is affixed to the end of nipple 18' which extends within the plate 19. The said puncturing member 30 is provided with a cutting and puncturing end 31 which is desirably oblique relative to the body per se of the said conduit 30. While this cutting and puncturing end 31 is similar to cutting and puncturing end 22 of the saber-tooth member 30, the position of these respective ends relative to the bottom 32 of container 21, may be differentiated.

Thus conduit 30 is straight and of relatively abbreviated length, being merely adapted to provide an opening in the top of the container as well as to extend therein sufficiently to provide a positive and effective outlet therefrom. On the other hand, member 20 may desirably extend substantially to the bottom 32 of container 21. A gasket 23 similar to that coordinated with saber-tooth member 20 is fitted over conduit 30 to afford a corresponding function as a sealing means for avoiding leakage from the opening in the surface of container 21 through which the said conduit 30 extends during the operation of the device.

A tubular supporting or carrying frame 33 is desirably attached at its respective ends 34, 35 to conduit 3, in any conventional manner for attaining a permanent association with the conduit as well as the base 1. As shown, the said ends 34 and 35 of frame 33 are positioned substantially contiguous the upper portion of the perimetric side wall surface 2 of base 1, and may be affixed thereto by welding, soldering or the like.

Plate 19 is preferably provided with slotted projections 36 and 37 adapted to embrace tubular frame 33. Through the expedient of pin 38 extending through projection 36 as well as the portion of tubular frame 33 in the slot thereof, plate 19 is pivotally attached to the said supporting frame 33. The slot of projection 37 likewise envelops the adjacent portion of frame 33, but is not attached thereto and is free to move thereover. Since the slots or openings of projections 36 and 37 are somewhat larger than the diameter of the tubular frame 33, and since the vertical dimensions of the opening in the tubular support 33 through which the pin 38 passes is greater than the diameter of the pin, a desirable element of looseness or lack of fitted restraint is afforded in the support of the plate 19 by the said tubular frame 33.

In this manner, there is provided a floating adjustment of the said plate 19, when it is subjected to a pressure relationship with respect to container 21 through the expedient of the locking or clamping means. As indicated in Fig. 1, plate 19 assumes an essentially horizontal position when the device is locked for operative use, with the aforesaid coordinated pressure relationship manifested between plate 19 and container 21, at the top 27 of the latter, through the expedient of the intervening gaskets 23, when the container is positioned on base 1.

In coordinating container 21 as an integral member of the apparatus, it is supported on surface 59 of base 1, and desirably positioned for correlation with plate 19 and receiving the aforesaid conduits 20 and 30. To facilitate positioning the container and aid its retention as an element of the combinative device, said surface 59 is preferably provided with a seat or groove 58, desirably of a configuration adapted to appropriately receive bottom 32 of the container. Furthermore a plurality of grooves or seats may be afforded on base 1, in order to accommodate containers of varied diameters and illustratively groove 75 is shown for a container of larger diameter than applicable to the aforesaid seat 58.

The desirable characteristics of the container may include an amenability to expedient puncturing, as by conduits 20 and 30, and in addition should afford the requisite strength to withstand applicable internal pressures equivalent to normal domestic water pressures in municipal or private water mains.

Moreover an element of expandability or outward distension, primarily at the end or top of the container, under the pressure conditions applicable therein during the operation of the device, may comprise a desirable attribute in facilitating the sealing of the container opening. The conventional type of expendable containers, especially those of tin, cellulosic and some of plastic or synthetic resin derivation, usually manifest a sufficient extent of expandable characteristics. It will however be understood that expandability is not an invariable requisite of the container, since other types may be utilized as further indicated by the details of disclosure herein.

Although the initially sealed, expendable type container may comprise the preferred embodiment, it will be understood that the use of containers having openings therein adapted for receiving conduits 20 and 30 are not precluded. In coordinating such containers with the device, the openings may be subject to sealing through the expedient of gaskets 23, when container 21 is correlated in pressure relationship with plate 19, and retained in position on base 1 as an integral part of the apparatus combination. This comprises a feature of the invention, whereby a sealed container which has previously been punctured and utilized in the device without exhausting the chemical contents, may be removed and subsequently reinserted, pursuant to pertinent or desirable circumstances.

In lieu of being entirely sealed prior to use, with the chemical contents therein, the container may be initially provided with the predetermined openings for receiving said conduits 20 and 30. Under such circumstances, the container may be derived from a material which does not particularly lend itself to puncturing, such as glass or steel, and may be relatively unexpandable when sealed under the internal pressures of operation.

In brief, the material comprising container 21 may be subject to substantial variation. Thus it will be dependent upon the desired properties of the container as well as the adaptation contemplated with respect thereto.

A particularly desirable gasket, adapted to the requisites of the present invention, is shown in Fig. 5, and comprises conical shaped member 23 having opening 24 extending longitudinally therethrough. Said opening 24 is adapted to permit the gasket to pass over member 20 to a position contiguous plate 19, the end 25 of the gasket which is of reduced diameter being positioned for pressure contact with the top 27 of container 21, while the enlarged end 26 is proximate to the undersurface of plate 19.

An alternative modification of gasket which has proved to be quite effective and markedly positive in its function is that shown in Fig. 6. This gasket 23′ is of cylindrical configuration and is hollow within the body thereof, as indicated by space 28. The bottom and top surfaces of this gasket are provided with openings 29 adapted to fit over puncturing conduit 20, for interposed positioning between plate 19 and container 21, in a manner similar to that indicated with respect to gasket 23.

While the gasket utilized, irrespective of its configuration, is substantially free from restrictions as to the material from which it is derived, it should desirably be somewhat yielding or resilient, and may be formed of natural rubber, or so-called synthetic rubber illustrated by neoprene, as well as from various types of synthetic resins which may afford requisite gasket properties. Moreover and without intending to be restricted by any theory or explanation concerning their function or adaptation, it is submitted that the sealing effect of the gaskets utilized is attributable to the characteristics of the gasket per se, and may be supplemented by any outward distension of the container top resulting from the internal pressure within the container during operation of the device. Thus a self-sealing action is accordingly attained by the pressure contact between container top and the gasket. This function is submitted to be applicable irrespective of the type of gasket utilized and pertains quite satisfactorily in connection with the modifications shown in Figs. 5 and 6.

With further reference to gasket 23′, its function appears to be effected through the liquid which enters space 28 from container 21. By virtue of the resultant expansion of the gasket walls, there seemingly results a surface pressure contact of the gasket with plate 19 and with top 27 of container 21. As for gasket 23, its function corresponds with that normally applicable to solid, substantially resilient members intended to afford an appropriate sealing effect, and by virtue of its conical configuration an expedient pressure distribution is effected, to provide the requisite function in the use of the device comprising the invention herein.

While conventional gaskets, either from the standpoint of material derivation or configuration, may be utilized, including the usual circular form of gasket, as previously indicated, the optimum embodiment of Fig. 5 has afforded a most effective and satisfactory sealing effect under the conditions of operation pertaining to the apparatus combination disclosed. Similarly the embodiment of Fig. 6 has functioned most effectively.

The locking means pertaining to the structure shown in Figs. 1–3 indicates a preferred embodiment, both from the standpoint of effective retention and expediency of operation. Thus it comprises a slotted boss 40, in unitary attachment with plate 19. The lower end of a turnbuckle 41 is pivotally fixed to said boss 40 through the expedient of pin 42. The turnbuckle comprises oppositely threaded stems 43 and 44, which are respectively fitted and attached to the internally threaded adjusting nut 45.

The upper extremity of stem 43 is integral with a head member 46 to which links 47, 48 are pivotally affixed at their respective ends 47′, 48′ by means of pin 49. At their upper ends links 47, 48 are desirably in integral attachment with a handle member or lever element 51, and in effect the resultant combination comprises a bell crank lever designated herein as 51'. Thus the upper end portions 67, 68 of links 47, 48 may expediently overlie the lateral end portions 52, 53 of said lever member 51, in brazed association therewith, or permanently attached in any other effective manner to afford a unitary assembly comprising the said links and lever member in an appropriate angular coordination, which may be, if desired, at substantially right angles.

This assembly is pivotally mounted through pin 50 on carrying frame 33 at 69, which, in effect, may substantially comprise the demarcation between horizontal portion 39 of frame 33 and the curvilinear portion 66 thereof, the latter shown as embracing the portion of frame 33 from the horizontal position of plate 19 to the said relatively horizontal portion 39. While these details of construction are desirable, it will be understood that they may be subject to substantial variation within the scope and purport of the invention.

However in lieu of the brazed association, the links 47, 48 and lever element 51 may expediently be fabricated ab initio as a unitary member in the form of the aforesaid bell crank lever. Similarly in standardized commercial production, where the adjustability afforded by turnbuckle 41 is unnecessary, a simple bar of any desired configuration may be expediently utilized in lieu of the turnbuckle 41. It will be understood in this connection that said bar will be pivotally attached, similarly to turnbuckle 41, at one end to boss 40 and at its other extremity to the lower end of the bell crank lever, such as to link ends 47, 47' or to a simple bar member which may comprise the lower part of the aforesaid unitary bell crank lever.

It will be noted that the said lever member 51 comprises a portion 54 substantially U-shaped in cross section and adapted to embody therein the relatively horizontal portion 39 of the supporting or carrying frame 33. The end portions 52, 53 thereof, in effect comprise spaced apart projections of the U-shaped portion of the lever member 51, and as indicated above, the portions 67, 68 of links 47, 48 are fixedly coordinated to form the aforesaid assembly of lever member and links.

In view of the U-shaped characteristics of the said lever member 51 to envelop or embody portion 39 of frame 33, it will be seen that the said projections 52, 53 of the lever member are spaced apart sufficiently to permit the aforesaid pivotal mounting of the assembly relative to frame 33 by pin 50. Thus the said links 47, 48 are likewise appropriately spaced apart, in order to permit the rotary movement of the assembly relative to frame 33, and as previously noted, the ends 47', 48' of the links are likewise appropriately coordinated with and contiguous the opposing spaced ends of head member 46 of the turnbuckle in a pivotal association. However as indicated above, a simple bar member may be utilized in standardized production of the apparatus, in lieu of said links 47, 48 as well as in lieu of turnbuckle 41.

The sturdiness and compactness of the device in its entirety is predicated upon the appropriate coordination of the parts and elements, pursuant to the preferred embodiments and modifications of the invention. In this connection, it will be seen, with reference to handle or lever member 51, that the lower edges 55 of the U-shaped portion 54 will preferably not extend below tubular frame portion 39 and should desirably be cut away or otherwise be distinctly above the lower surface 56 of the said portion 39. As a result thereof, the device, as a whole, lends itself to being supported or carried.

The clamping or locking action, as applied to container 21, is attained through the combined function of the bell crank lever 51', coordinated with turnbuckle 41, or its equivalent such as the solid bar which may be utilized in lieu thereof, boss 40, and plate 19 in association with the said container 21. Thus nut 45 is subject to adjustment in order to provide the predetermined, relatively horizontal position of plate 19, when lever member 51 essentially envelops portion 39 of carrying frame 33. Under these circumstances, the said clamping or locking effect is afforded through the expedient of links 47, 48 which assume a position essentially in alignment with turnbuckle 41, the said alignment being substantially perpendicular to the surface of plate 19. In this manner a positive pressure effect is manifested through gaskets 23 on the surface 27 of container 21 positioned on base 1.

Conversely when the flared end 57 of handle member 51 is elevated by an upwardly directed force, the said bell crank lever assembly will pivotally rotate on pin 50, and the attendant upwardly directed curved path of lower end portions 47', 48' of the links 47, 48 will function to elevate plate 19, through the expedient of the aforesaid pivotally coordinated turnbuckle and boss attachments, with the links at one extremity and the boss at the other. This elevation of the plate comprises the pivotal rotation of the same, at its slotted projecting portion 36, on pin 38 relative to tubular frame 33, while the substantially diametrically opposed slotted projecting portion 37 rides over curved portion 66 of the carrying frame 33, it being noted in this connection that said portion 66 of the frame may in effect desirably be bent to a radius or arc having pin 38 as the point of rotation.

The conduit 3 is adapted to afford requisite pressure differential in the flow of fluid therethrough. Thus any means may be utilized whereby the velocity of the liquid passing through conduit 3 will be subject to variation in respective portions thereof to the extent that a pressure drop is effected, in the direction of flow, at least for an interval of such flow.

The pressure differential may be attained in any expedient manner, illustratively by any variation in the relative cross sectional area of at least two adjacent portions of the conduit. Thus it may be effected through the structural design characteristics of the conduit, exemplified by an abrupt enlargement in the cross sectional area thereof for at least a portion of its length, or through the utilization of an appropriate means positioned within the flow passes of said conduit 3.

However a preferred adaptation for effecting the said pressure differential in conduit 3 is by means of a comparatively restricted passage therein through the expedient of substantially any known type of flow restricting means. A preferred modification comprises the venturi type of device, including the full or theoretical venturi as well as the partial type of venturi, such as that shown in Figs. 1 and 4. Thus the full venturi comprises a restricting passage of two frustums with an intermediate zone or throat of minimum diameter or maximum restriction. The opening of the frustum on the upstream or inlet side of the venturi corresponds with the diameter of the conduit within which the venturi is positioned, such as conduit 3. This inlet frustum gradually converges such as at a vertex angle of 25°–30° to the restricted zone or throat. The outlet frustum or downstream portion of the venturi gradually expands or diverges at an angle of 7° or less to merge with the full diameter conduit. Moreover the throat or restricted zone should manifest certain characteristics in its diameter and length, relative to the inlet diameter. (See Chemical Engineer's Handbook, by John H. Perry, 2d edition, 1941, pages 843, 844 and 855, published by McGraw-Hill Book Company, Inc.)

While the full venturi is practicable relative to the present invention, the partial venturi 60 has been found quite desirable and satisfactory. By way of further illustration of other types of restricting means effectively utilizable pursuant to the present invention are the orifice plate 74, shown in Fig. 7 and the long radius nozzle 105 indicated in Fig. 10. It will be understood that the particular restricting means utilized will manifest a characteristic pressure differential in conduit 3 on the respective sides of the restricting means. This will thereby necessitate pertinent adjustment of the selector valve 13 for obtaining chemical substance from the container 21 in predetermined concentration.

The positioning of the flow restricting means is desirably between the by-pass or take-off line 9 and the point at which the return conduit 9' is integral with the main conduit 3. As shown in Figs. 1 and 4, the said by-pass or take-off conduit 9 may be contiguous the inlet side 61 of the venturi, while the connection of the return conduit 9' to pipe 3 is contiguous the outlet side 62 of the flow restricting means, such as venturi 60. It will however be understood that said conduit 9 may be connected with any expedient point of conduit 3 on the high pressure side of the liquid flowing therethrough. Similarly conduit 9' may be coordinated with conduit 3 at any expedient point of relatively low pressure flow therein, and including any point at or in the flow restricting means that will manifest a pressure drop or effect a pressure differential with respect to the relatively high pressure flow.

Preferably the conventional ball check valve 63 is positioned within nipple attachment 8' wherein a seat 64 is provided therefor at the upper end of the passage or conduit 65 leading to fitting 7', which is an open connection with the said conduit 3. To facilitate the flow of liquid from conduit 9' into pipe 3, the said attachment 8' may desirably be provided with grooves or channels 69 on the inner surface thereof. Thus channels or grooves 69 are adapted to facilitate flow at all times through nipple attachment 8' from conduit 9' into conduit 3, but not in the opposite direction which is at all times prevented.

The integral coordination of the various members and elements as a unitary, combinative structure will be clear from the manner in which it is utilized and operated, as well as in view of the function and characteristics of the device. With further reference to the embodiment of the invention shown in Figs. 1-4, in order to position container 21 on base 1, lever or handle member 51 is elevated and the plate 19 is thereby raised to the requisite extent.

With the can in its predetermined position in the appropriate groove or seat, illustrated by 58 or 75 on base 1, dependent upon the diameter of the container, the clamping or locking means is effectuated as described hereinabove by rotating lever member 51 to its substantially horizontal position.

During the course of rotating the said lever member 51 to the aforesaid clamping or locking position, with the attendant downward rotation of plate 19 from its uppermost or open position to its corresponding clamping or locking position, as shown in Fig. 1, the cutting and puncturing end 22 of saber-tooth shaped conduit 20 will penetrate the said surface 27, extending into container 21 to a point at which the opening of puncturing end 22 is contiguous bottom 32 of the can and substantially parallel thereto. Similarly cutting and puncturing conduct 30 will likewise effect contact with top 27 of the can 21, its cutting and puncturing end 31 penetrating thereinto.

Thus when the device of Fig. 1 is assembled for operative use, with container 21 seated on base 1 and plate 19 in substantially horizontal, locked position as well as in pressure relationship with container top 27 through interposed gaskets 23, member 30 will be vertically positioned with its cutting and puncturing end being directed substantially perpendicular to container bottom 32 and with the opening at said end 31 angularly disposed relative to said bottom 32. At the same time and by virtue of the curvature of member 20, the opening at end 22 thereof will be essentially parallel to the said container bottom 32, thereby permitting a closer proximity of the said outlet opening at end 22 relative to container bottom 32 than would be attainable with a vertically extending member provided with a cutting and puncturing end having the desirable oblique form applicable to end 22. This relative position of opening 22 with bottom of can prevents undue turbulence and admixing of the chemical with the liquid introduced from conduit 9 and selector valve 13 for creating the pressure within the can or container 21.

The aforesaid distinctions in the dimensions and positioning of the respective cutting and puncturing members 20 and 30 are particularly effective where the chemical substance utilized comprises a liquid having a specific gravity lighter than water, and a minimum of dilution with the water is contemplated within the chemical container. However it will be understood that this coordination of conduits 20 and 30 may be of general application, as well, such as with respect to chemical substances having a specific gravity comparable with water, and similarly in connection with solid chemical substances in container 21.

In any event it will be understood that while the aforesaid characteristics and positioning of the respective conduits may be generally preferable, this is not intended to be limiting in scope and may be subject to variation within the purview of the invention. By way of illustration, where the chemical substance in container 21 comprises a solution having a specific gravity heavier than the vehicle flowing through conduit 3, such as water, it may be desirable to utilize in lieu of conduit 20, a short length cutting and puncturing conduit similar to conduit 30 in attachment with the fittings coordinated with conduit 9 for effecting the by-pass flow of vehicle to the container, while the flow of chemical liquid from container 21 desirably would be through a conduit similar to cutting and puncturing conduit 20 and duly coordinated with return conduit 9'. In other words, conduits 20 and 30 may desirably be interchanged in their relative positions, especially where the solution of chemical substance has a specific gravity in excess of that of the vehicle.

Likewise while the angular cutting and puncturing ends 22 and 31 respectively of conduits 20 and 30 comprise a preferred modification in affording relatively uniformly-edged openings in the container 21 which lend themselves to facilitated sealing by the conduit gaskets, other types of cutting and puncturing ends may be resorted to with varying elements of practicability. Moreover it will be further understood that the lengths of conduits 20 and 30, especially relative to their extension within container may be subject to variation, pursuant to the dictates of operation or substances utilized as chemical agent and vehicle, within the scope of the invention herein.

With container 21 in a locked or clamped position relative to base 1, and with conduits 20 and 30 extending into the same, it becomes a coordinated part of the device. As distinguished from its original status of a replaceable, expendable sealed container, it becomes an integral and indispensable entity of material significance in the combinative structure, and especially in the fluid flow system, in effect comprising a pressure vessel or chamber manifesting a functional role in the proportioning and supply of its contents to the main flowing stream of vehicle in conduit 3.

The liquid vehicle flowing into the container 21 in controlled quantity creates a pressure within the same, and where the container is of the expendable type, such as a tin can, the top thereof will expand to some extent, thereby contributing to the sealing function of the gasket, as indicated hereinabove. As the pressure differential between that in the container and that at 71 in conduit 3 becomes sufficient, the liquid vehicle flowing into the container will force a corresponding quantity of the chemical out of the container into the main flow of the liquid vehicle at 71.

On its intake side, represented by coupling 4, the device is connected in any expedient manner, with a supply of liquid vehicle under pressure, and appropriate means are likewise attached to the outlet coupling 5 of the device for dispensing or distributing the vehicle. Where for example, dispensing the substance of container 21, in controlled concentration, is contemplated, a flexible garden hose connected with any valved water outlet may desirably be attached to coupling 4. Similarly a flexible hose, supplied with a nozzle or other liquid distributing means, may be attached to coupling 5 on the outlet end of conduit 3.

The water flowing under pressure through the hose attached to coupling 4 will pass directly through conduit 3 and its outlet hose connection, subject to the effect of the restricted passage, such as venturi 60 in the said conduit. At the same time, water will flow through by-pass or flow-diverting conduit 9, and through selector valve 13, set at a predetermined orifice passage or adjustment corresponding with the desired concentration of chemical substance for the water stream that has flowed through the venturi in conduit 3. From the selector valve 13, the by-pass stream of water will flow into container 21, through the expedient of the cutting and puncturing conduit 20, entering container 21 in proximity to the bottom 32 thereof, from the opening at portion 22 of the said conduit 20. As previously pointed out, this modification is particularly desirable, especially where the chemical substance in container 21 is a liquid having a specific gravity less than that of water, since the supply of water under pressure through the saber-tooth shaped conduit 20 at its outlet opening, adjacent and substantially parallel to bottom 32 of the container, will tend to result in a minimum extent of turbulence, if any, with a relatively negligible dilution of the chemical substance passing from the said container 21 through the top thereof.

As previously indicated, the by-pass or diverted flow from the main stream of liquid in conduit 3, through by-pass 9, results in a pressure development therein, by virtue of the characteristics of the apparatus, with the result that the container essentially becomes a pressure chamber. Thus the egress of chemical substance is effected by the said pressure created within container 21, which is greater than the pressure existing in the main flow of vehicle, such as water, at the point 71, where the chemical substance passes into conduit 3. The course of flow applicable to the chemical substance forced from container 21 by the aforesaid pressure differential is through the cutting and puncturing conduit 30, and thence through the fittings attached thereto as well as conduit 9', entering conduit 3 through the fitting 8', wherein check valve 63 is positioned.

Thus on sides 62 of the flow restricting means or venturi 60, the chemical substance becomes admixed in predetermined concentration with the main stream of water flowing through conduit 3, the proportion being substantially dependent upon the relative characteristics of the said venturi and the orifice passage in the selector valve 13, assuming allowances have been made for various factors such as frictional losses, the difference between the water and the chemical substance as to specific gravity, viscosity, surface tension, et cetera. Upon the admixture of the chemical substance, in regulated quantities, with the flowing stream of vehicle, such as water, at the said outlet end 62 of the venturi passage, the resultant liquid then flows through any expedient conduit, such as through the flexible hose connection coupled to the male hose fitting 5, to the point where it is subject to distribution in any predetermined manner, such as by a nozzle or other distributing means, desirably attached to said hose.

When the container becomes essentially depleted of its contents, an abrupt and very sharp drop of chemical substance concentration in the vehicle flow is manifested. This point may be ascertained quite expediently by visible observation, where the chemical substance is adapted to provide a distinct coloration of the vehicle with which it is admixed; by the absence of characteristics peculiar to the mixture, such as foaming when the chemical agent is a foam producing agent, et cetera; or by any other desired means, such as a transparent container or conduit.

When container 21 has been depleted of its chemical contents, it may be removed with the utmost facility from base 1 and replaced by another sealed container of chemical substance, or replenished as to its content thereof. The by-pass flow of vehicle through conduit 9 may be discontinued during the replacement of container 21 by closing selector valve 13 to the flow of any fluid therethrough. The effect of said selector valve 13 closure is to terminate the pressure displacement of chemical substance from container 21 through conduit 9', and past check valve 63 into conduit 3 on the outlet side 62 of venturi 60. As described hereinabove, the passage of vehicle from conduit 3 upwardly through conduit 9' into container 21 is prevented by the check valve 63 closing off the upper opening 76 of fitting attachment 8'.

The operative utilization of the device may be terminated whenever desired, irrespective of the residual or remaining chemical contents within said container 21. On discontinuing the flow of liquid vehicle through conduit 3, by shutting off the same at a point beyond outlet coupling 5, the pressure differential applicable to the forcing of chemical substance from container 21 will be curtailed, and the resultant pressure equalization throughout the system will serve to retain the device in a status quo adapted for subsequent usage when and as desired. Similarly if the flow of liquid vehicle is shut off before intake 4, the flow of chemical from can 21 will cease.

In effect, the proportioning system of the device may be substantially closed off from any possibility of contamination or dilution of the chemical substance in container 21 when the flow of the vehicle per se, such as water, is alone contemplated, or in the event that the structure, as a whole, is not in operative use. Furthermore a container of which the chemical content has only been partially used, can be entirely removed from the device and stored indefinitely by the expedient of plugging or sealing up the holes in the top. The balance of the chemical content can later be used by replacing the can in the device in such a position that conduits 20 and 30 enter into the said holes in the top thereof.

Without intending to be restricted to any particular theory or explanation of the manner in which the proportioning of chemical substance to vehicle is attained, a plausible indication of the fundamentals and principles of operation, which, it is believed, applies, is most expediently shown by a reference to Fig. 7. The said Fig. 7 is diagrammatically comparable with the proportioning means contemplated in the embodiment of Figs. 1–4, except that the flow restricting means in conduit 3 comprises a simple orifice plate 74. As previously indicated, the flow restricting means in conduit 3 of Figs. 1–4 may be subject to variation within the skill of the art, and in lieu of the partial venturi 60, the orifice plate 74 may be utilized. Likewise the long radius nozzle orifice of Fig. 11 may be utilized in lieu of said venturi type flow restricting means. It will however, be understood in this connection that notwithstanding the fundamentally similar function of the various flow restricting means subject to utilization, any given flow restricting means manifests detailed characteristics peculiar thereto. Thus the relative adjustments of selector valve 13, or the characteristics of the orifice passages therein, will be affected by the type and characteristics of the flow restricting means in conduit 3.

In order to facilitate the consideration of the operative fundamentals, irrespective of the type of flow restricting means utilized, the structural elements of Fig. 7 are designated by the same numerals as those applied to the aforesaid Figs. 1–4, the differences applying to the said orifice plate 74, as well as the inlet side thereof 72 and outlet side 73. Thus to all intents and purposes, inlet side 72 of orifice plate 74 corresponds with the inlet side 61 of venturi 60; and likewise outlet side 73 of Fig. 7 is comparable with outlet side 62 of Figs. 1–4.

Thus Fig. 7 includes the fragmentary presentation of conduit 3, a by-pass conduit 9, extending substantially to the bottom 32 of container 21, said by-pass 9 having a metering orifice 70 therein, which in essence corresponds with an orifice passage in selector valve 13 of Fig. 1. The return conduit 9' is shown extending from the upper surface 27 of container 21 to conduit 3, the point of connection between conduit 9' and conduit 3 being at 71. Accordingly by-pass conduit 9 is connected with conduit 3 on the inlet side of orifice plate 74, while return conduit 9' is affixed to conduit 3 on the outlet side 73 of said flow restricting means 74.

Through the expedient of the flow restricting means 74 in conduit 3, there is attained a pressure drop between its intake side 72 and its outlet side 73, dependent upon the inherent characteristics of the flow restricting means within the conduit 3 and also upon the flow therefrom. It is through the expedient of this pressure differential that the pressure in container 21 becomes sufficient to effect the flow of chemical substance from container 21 through conduit 9' into admixture with the vehicle flowing through conduit 3 at point 71 on the outlet side 73 of the flow restricting means.

As a result of the residual pressure in conduit 3 at 72, a by-pass or diverted flow of the vehicle, such as water, will pass through conduit 9, thence through metering orifice 70 and into container 21. This water flow into container 21 exerts a pressure therein of greater magnitude than that at point 73 on the outlet side of flow restricting means 74, due to the pressure drop created thereby. As a result of this pressure differential, the chemical content within container 21 is forced therefrom through return conduit 9', and becomes admixed with the flowing stream of water 71 in conduit 3. The amount of chemical substance which is thus supplied through conduit 9' corresponds with the amount of water passing through metering orifice 70, which amount is controlled by two factors: (1) the diameter of said metering orifice, and (2) the pressure differential between residual pressure of fluid in conduit 9' at point 7' and the residual pressure of fluid in conduit 3 at point 73. The greater this pressure differential, the greater will be the flow of liquid through a given diameter of metering orifice. Conversely, the less this pressure differential is, the less will be the flow through a given diameter of metering orifice. The said pressure differential in turn varies in accordance with the flow through conduit 3. Thus a greater magnitude of flow in conduit 3 will result in a greater pressure differential, and similarly a flow reduction will result in a reduced differential pressure. Accordingly, once the proportion of chemical to fluid vehicle has been determined by the size and characteristics of the metering orifice 70 in relation to the size and characteristics of the restriction orifice 74, these relative proportions are essentially maintained automatically under wide variations of pressures and flows. It will be seen therefore that after the percentage of mixture of chemical reagent to fluid has been determined by the manual selection of the appropriate diameter of metering orifice, the desired proportioning will be obtained automatically over a broad range of pressures and flows.

In operation, it may be desirable to allow for various factors, such as friction losses, viscosity differences as between the chemical substance and the vehicle, distinctions in specific gravity, variations of pressure differential at the point at which the chemical substance is introduced into conduit 3, et cetera. This is desirably accomplished by an orifice diameter at 70 either increased or decreased in relation to the diameter of flow restricting means 74, to obtain a given proportionate ratio of concentrations of chemical substance in the vehicle.

The details of attaining a predetermined pressure differential and control concentration of chemical substance relative to vehicle flow may be further subject to variation within the purport and scope of the invention. For example, the metering orifice 70 of Fig. 7, or the corresponding selector valve 13 of Fig. 1, may be positioned in the return conduit 9' in lieu of by-pass conduit 9, as shown. Fundamentally the applicable details pertaining to the differential pressure will be the same, irrespective of the particular position of the metering orifice 70.

Apart from the optimum embodiment of the device, as shown in Figs. 1–3, other effective modifications involving fundamentally similar principles of operation are afforded within the purview of the invention. A quite satisfactory structure comprises that shown in Fig. 8, which is illustrative of applicable diversifications of structural details.

It will be noted that in this modification, the main flow conduit 79, through which the principal stream of vehicle passes, comprises inlet portion 86, extending in a horizontal direction and desirably located at an elevation somewhat above plate 19 at one side thereof. Said portion 86 merges with vertical portion 87 of said conduit 79 and is therefore substantially at right angles with said portion 87. The outlet end of conduit 79 comprises portion 88 at right angles to portion 87, and passing through the apron or side walls of base 1 similarly to conduit 3 of the previous device modification described above. Conduit 79 is provided with an inlet coupling 4, and likewise an outlet coupling 5 is supplied to portion 88 of said conduit 79.

In lieu of the tubular carrying or support frame 33 shown in Fig. 1, the tubular frame 90 of the present modification terminates on one end at the upper surface 89 of conduit portion 86 to which it is permanently affixed. In effect the conduit portion 87 comprises a part of the carrying or support frame 90, which otherwise conforms with the configuration of tubular member 33 in Fig. 1. Thus tubular member 90 is provided with a relatively horizontal portion 39, a comparatively curved portion 66, and the vertical section 78, the latter being integrally attached to surface or top 59 of base 1.

With further reference to Fig. 8, it will be seen that conduit 79 is provided with a projection 96 toward the upper end thereof located on the surface 97 of portion 87, that is, on the surface of 87 facing portion 78 of carrying frame 90. The slot of projection 36 of plate 19 is adapted to fit over the projection 96, and is pivotally attached thereto through the expedient of pin 95. Thus plate 19 is adapted for a rotary movement relative to the said projection 96 of conduit 79. The locking or clamping means is applied to the slotted projecting portion 37 of plate 19, which is diametrically opposed to the aforesaid slotted projection 36, and is adapted to embrace the carrying or support frame as well as to rotate over portion 66 thereof.

Concerning the details of the by-pass or flow-diverting assembly, correlated with plate 19 and main flow conduit 79, and adopting designating numerals of any members similar to those of the embodiment of Figs. 1–3, the nipple 7 and fitting 8 are applied to surface 39 of conduit portion 86, and a flexible by-pass conduit 9 is attached at one of its ends to said fitting 8. The opposing end of the said conduit 9 is coordinated with appropriate fitting 10, integral with elbow 94, the latter being attached to selector valve 13, provided with handle member 14. As in the device of Figs. 1–3, the said selector valve 13 is correlated with plate 19 through fittings 17 and 18.

A relatively abbreviated conduit 91 is affixed to fitting 18 and projects from the undersurface of plate 19. Desirably the gasket utilized in connection with cutting and puncturing conduit 91, over which it is seated in proximity to the under surface of plate 19, is one of the preferred modifications 23 or 23', as shown in Figs. 5 and 6. It will be noted the expansible form of gasket 23' is indicated on Fig. 8.

The cutting and puncturing conduit 93 is integrally affixed to the upper surface 59 of base 1. Desirably the said conduit 93 is not in alignment with conduit 91. Conduit 93 is coordinated with and opens into horizontal portion 88 of main flow conduit 79. The lower part 98 of conduit 93 is provided with any expedient check valve, such as check valve 107, similar to check valve 63 shown in Figs. 1 and 4, in order to afford a comparable function therewith. It will be understood in this connection that the said check valve will prevent the flow from conduit portion 88 upwardly, but will afford free passage to the downward flow of chemical substance through said conduit 93, and desirably appropriate grooves or channels 108, similar to groove 69 of Fig. 4, may be coordinated with the check valve seat.

Similarly to the other cutting and puncturing conduit 91, a gasket is peripherally fitted to the said conduit 93 and contacts the surface 59 of base 1. Thus both conduits 91 and 93 will preferably be provided with conical gasket 23 or expandable gasket 23'.

It will be seen that the device of Fig. 8 does not involve a flexible return conduit comparable with conduit 9' utilized in the device shown in Fig. 1. In lieu thereof, the cutting and puncturing conduit 93 essentially comprises the return conduit, in coordination with appropriate fittings for its connection with portion 88 of conduit 79.

It will be understood that any appropriate flow restricting means will be provided within main flow conduit 79, as in the portion 88 thereof preceding the point at which conduit 93 is coordinated therewith. Thus the flow restricting means may be of the venturi type, as illustrated by Figs. 1–4, or the orifice plate modification shown in Fig. 7, or the long radius nozzle type of flow restriction to which Fig. 10 pertains. In this connection the said flow restricting means of Fig. 10 is diagrammatically indicated within portion 88 of conduit 79, and the details of Fig. 10 are further illustrative of a coordination of the said long radius nozzle type of flow restricting means with conduit 93 of Fig. 8.

An expedient manner of correlating conduit 93 with the said conduit portion 88 is indicated in Fig. 10. Pursuant to this showing, the said conduit 93 is attached to the bushing 100, either by a threaded association, or in any other expedient manner. The said bushing 100 is affixed to conduit portion 88, as by the surface threads thereon adapted for combination with an appropriately htreaded opening 101 of the conduit. Thus said conduit 93 provides a dual function, serving as a cutting and puncturing means at its end 102 adapted for penetrating within container 21, and, also acting as a return conduit, extending from opening 103 at the bottom 32 of container 21 to the aforesaid fitting 100, through the latter to the portion 88 of conduit 79.

The said combined cutting and puncturing means as well as return conduit 93 is desirably coordinated with an appropriate check valve. As shown in Fig. 10, the bottom surface 106 of the said bushing or fitting 100 comprises a seat for the check valve 107. Grooves or channels 108 are desirably provided within bushing 100 to facilitate the return flow of the chemical substance from conduit 93 through the said bushing, and thence by ports 109 into conduit portion 88 on the outlet side 104 of flow restricting means 105, comprising the long radius nozzle type.

The discharge from conduit 93 through ports 109 is into the annular zone 110 located peripherally of the wall portion 111 of the flow restricting means 105. The chemical substance flows into the said annular zone 110 for admixture with the vehicle, such as water, which has issued from the outlet 112 of said flow restricting nozzle 105.

With further reference to the details of the pertinent locking means shown in Figs. 8 and 9, the U-shaped lever element or handle member 51 is pivotally attached to tubular frame 33 by a pin 80, positioned on the relatively vertical portion 78 of said tubular frame, in proximity to the under surface of slotted projecting portion 37 of plate 19. A wire loop 81 is fixed at its respective ends to the side portions 52, 53 of the said lever member 51, and is seated in groove 82 on the said slotted projection 37 of the plate. In order to retain the said wire loop in groove 82, a slotted plate member 83 is appropriately attached to plate 19, and conforms with the design of the slotted projection 37 of the plate. A groove 84 is provided on the under surface of the said plate member 83, adjacent the edge thereof, said groove 84 being located in conformity with groove 82. Thus grooves 82 and 84 in superimposed position relative to each other provide a pocket within which portion 85 of the wire hook 81 is positioned and adapted to rotate.

With this modification of locking means, lever member 51 may be rotated substantially to the point at which it contacts portion 66 of the tubular frame, and assumes an essentially vertical position. In other words, the rotation of lever member 51 may be substantially 180°, and functions to elevate plate 19 through the expedient of the aforesaid wire loop 81 attachment. With plate 19 sufficiently elevated, container 21 may be tentatively retained by hand between conduits 91 and 93, the bottom 32 of the container resting on the said conduit 93. In rotating lever member 51 downwardly from its elevated position to its locking or clamping location, as it is shown in Fig. 8, the plate 19 is likewise caused to rotate downwardly about its pivot 95 toward its horizontal locking or clamping retention. During the course of this locking operation, cutting and puncturing conduit 91 penetrates through the upper surface of container 21, and cutting and puncturing conduit 93 also penetrates through the bottom 32 of the said container 21.

As a result of the simultaneous locking of container 21 in position between plate 19 and surface 59 of base 1, through the intervening gasket 23, with the said conduits 91 and 93 extending therein, the said container becomes an integral and significant part of the over-all device, similar to its function in connection with the previously discussed embodiment of the invention.

While the device of Fig. 8 is generally applicable to the same extent and manner as the embodiments previously described, it is especially effective where the chemical substance is a liquid having a specific gravity in excess of that which applies to the vehicle.

In its operation, assuming the vehicle to be water, coupling 4 is connected with one end of a flexible hose, the other end of which is attached to the source of water supply. The water will flow through portions 86, 87 and 88 of conduit 79, thence through the outlet thereof at coupling 5, to which there is connected a flexible hose desirably provided with any appropriate distributing means.

With selector valve 13 at a predetermined setting to afford a given concentration of chemical substance, water from portion 86 of conduit 79 will be diverted through by-pass 9, then through the appropriate passage restriction of selector valve 13, from which the water will pass through cutting and puncturing conduit 91 into container 21, whereby a pressure is attained within the said container 21 relative to the contents thereof.

When the container 21 has become depleted of its contents of chemical substance, it is merely necessary to remove the container 21 by release of the clamping or locking means.

Fig. 11 in essence provides a diagrammatic indication of an expedient modification of selector valve 13, showing restricted passages 113 and 114 of differentiated dimensions. Thus where passage 113 is correlated with by-pass conduit 9, a given concentration of chemical substance is afforded. Similarly orifice passage 114 will afford a different predetermined concentration of chemical substance. In addition selecter valve 13 can be positioned so that it is closed, under which circumstances there is no flow through it and consequently no proportioning. It will be understood that the body 115 of the selector valve may be designed to provide more than two differentiated restricted passages if desired.

Since the modifications and embodiments of the invention shown in the respective figures of the drawings are essentially illustrative, it will be apparent that substantial variations may be applied within the purview and scope of the invention and the sphere of expected mechanical skill. Thus the details pertaining to the bypass conduit, the return conduit, the cutting and puncturing conduits, the flow restricting means comprising those of the selector valve or its equivalent, as well as that within the main flow conduit, and the other structural details, such as frame locking mechanism, plate design, etc. embodied in the features of the invention, may be subject to diversification in view of the concept and principles within the scope of the teaching and disclosure herein. Similarly the material from which the various parts of the structures are fabricated is not of critical significance, and is subject to the dictates of the conditions and adaptations pertaining to the use of any device within the scope of the disclosure.

Likewise subject to substantial diversification is the arrangement and positioning of various elements or parts of the device, such as the fittings, the selector valve, and the conduits. Thus illustratively within the skill of the art, the fittings and selector valve may be coordinated with base 1 in lieu of with plate 19, and flexible conduits 9 and 9' may be duly correlated with said elements or parts. In this connection, both cutting and puncturing conduits 20 and 30, or 91 and 93, may be coordinated with said base 1, such as with surface 59 thereof.

The wide field and adaptations applicable to the invention are manifested by the diversified types of chemical substances which may be dispensed and distributed thereby. Thus wetting agents, insecticides, fertilizers and fire extinguishing types of compounds or compositions, such as foam producing agents may be utilized. Moreover it will be understood in this connection that the main flow of fluid may function in the capacity of chemical agent per se as well as a vehicle for the chemical substance supplied thereto in regulated proportions. It is accordingly apparent that the adaptations of the invention include the insecticidal, fertilizer and fire extinguishing arts among others, such as that of distributing or dispensing wetting agents and foam producing substances.

Pursuant to the invention, a novel practicable fluid proportioning and dispensing device is afforded, manifesting among its attributes sturdiness, and simplicity of structure, as well as facility of operation. Of material significance is the enhanced efficiency and increased operative flexibility provided.

Among the features indicated in the consideration hereinabove, or supplementary thereto, is the facility of removing or replacing the container of chemical substance without any necessity for disengaging the apparatus or affecting its compact assembly, this being effectuated if desired without interrupting the main flow of fluid.

Another distinct feature comprises the expendable sealed container for the chemical substance to be dispensed in appropriate proportion. In addition to the practicable and expedient aspects thereof, the expendable container affords a distinct feasibility in the handling of toxic materials, such as insecticides, disinfectants and the like, in concentrated form, especially where the container is in a sealed state, and subject to use under conditions of dilution which tend to minimize the hazard of toxicity.

Suffice it to state that the novelty and utility of the invention, illustrated by the various structural embodiments described herein provides attributes and advantages not heretofore attainable in the art of proportioning chemical substances with a flowing stream of fluid, which may function as a vehicle for the chemical substance whether or not per se it comprises an active reagent in the field of application. In this connection the term "fluid" and the term "liquid," as utilized in the specification as well as in the appended claims, are both intended to embrace within their scope a suspension or dispersion, within the normal definition of said terms "suspension" and "dispersion". Thus the dispersion or suspension of solid or liquid particles is contemplated within the significance of the said terms "fluid" and "liquid."

While we have described our invention in accordance with desirable embodiments, it is obvious that many changes may be made in the details of construction, as well as in the combination and arrangement of parts, without departing from the spirit of the invention as defined in the following claims.

Having thus set forth the invention, we claim:

1. An apparatus combination for the proportioned dispensing of a liquid substance which comprises a supporting base, a main conduit attached to said base and adapted for the passage of a liquid stream therethrough, a flow restricting means within said main conduit for effecting a pressure differential affording relatively high and low pressure areas within said conduit during the passage of the stream therethrough, a container on said base and free from any permanent association therewith, means for retaining said container in locked position relative to said base and for releasing the container from said locked position, a first conduit connecting said main conduit, at a high pressure area thereof, with said container and adapted for diverting a flow of liquid from said main conduit into said container, a second conduit connecting said container with said main conduit at a relatively low pressure area in said main conduit and adapted for the flow of liquid substance to be dispensed from the container into the liquid stream for admixture therewith in the main conduit, a metering means coordinated with one of the said conduits connecting the container and the main conduit, for regulating the flow of liquid substance from said container in proportioned relationship to the flow of the stream within the main conduit, the said first and second conduits extending through respective openings in the container surface and having their respective terminous openings within the container, said container being otherwise closed and substantially leakproof, and means effecting sealed connections between said first and second conduits and the openings in the container surface through which they extend, said connections being free from any permanent association with said container when the said conduits extend into the same and the container is retained in locked position on the supporting base, whereby the said conduits are expediently removable and replaceable relative to the said container and the said container is expediently removable and replaceable relative to the said supporting base.

2. An apparatus combination as in claim 1, wherein the flow-restricting means is a venturi.

3. An apparatus combination as in claim 1, wherein the container having therein the liquid substance for dispensing is puncturable and expendable, and the two conduits connecting the container with the main conduit are adapted for puncturing the said container surface to provide the openings through which they extend with their respective terminous openings within the container, when the container is in locked position on the said supporting base, the said conduits being coordinated with means for effecting a sealed connection with the openings in the container surface when the container is in the said locked position.

4. An apparatus combination as in claim 1, wherein a metering means is coordinated with said first conduit and comprises a selector valve having a plurality of restricted orifices of different dimension and respectively coordinatable with said first conduit, and wherein a check valve is coordinated with said second conduit in substantial proximity to the main conduit for precluding the flow of liquid from the main conduit to said container, and permitting the expedient removal of the container from its connection with the first and second conduits without interrupting the flow of fluid through the main conduit.

5. An apparatus combination for the proportioned dispensing of a liquid substance which comprises a supporting base member and a frame member coordinated therewith, a main flow conduit integral with said base member and adapted for the passage of a liquid stream therethrough, a flow restricting means within said conduit for effecting a pressure differential in the flow of said stream and affording relatively high and low pressure areas in said main conduit during the passage of the stream therethrough, a sealed expendable and puncturable container for the substance to be dispensed, means for locking the said container in position on the said base member, said locking means being affixed to the said frame member, a first conduit connecting said main conduit at a high pressure area thereof with said container and adapted for diverting liquid from said main conduit into said container, a second conduit connecting said container with said main conduit at a relatively low pressure area in said main conduit and adapted for the flow of liquid substance to be dispensed into the liquid stream for admixture therewith in the main conduit, and an orifice metering means, coordinated with one of the said conduits connecting the container and the main conduit, for regulating the flow of liquid substance from said container in proportioned relationship to the flow of said stream, said first and second conduits being adapted for cutting and puncturing the sealed container and for effecting sealed connections therewith free from any threaded and permanent associations, said container being expediently removable and replaceable relative to said first and second conduits, one of said conduits connecting the container with the main conduit extending through the top of the container and having its outlet end substantially at the bottom thereof, and the other conduit connecting the container with the main conduit extending through the top of the container and having its outlet end in the upper portion thereof.

6. An apparatus combination as in claim 5, wherein the sealed container is puncturable and said first and second conduits are adapted for cutting and puncturing the container and for effecting sealed connections therewith and wherein a check valve is positioned in said second conduit in reasonable proximity to the main conduict for precluding the flow of liquid from said main conduit to said container.

7. The apparatus combination as in claim 5, wherein a plate means is actuatably mounted on said frame means in superimposed relationship to the upper surface of the container positioned on said base member, and wherein means are attached to said plate means for actuating the same to a position for locking and clamping said container relative to said base member and for releasing said container from said base member.

8. The apparatus combination as in claim 7, wherein the locking and clamping means comprises said plate means pivotally mounted on said frame means in superimposed relationship to the upper surface of the container positioned on said base member, and means attached to and adapted for rotating the said plate means to a position for locking and clamping said container relative to said base member and for releasing said container from said base member, and wherein the conduits adapted for cutting and puncturing the container are integrally attached to said plate means and function to cut and puncture the said container during the rotation of the plate means to the said position for locking and clamping said container relative to the base member, one of the said conduits for cutting and puncturing the container extending through the top of the container and having its outlet end substantially at the bottom thereof, when the said plate means is in its locking and clamping position, and the other of the said conduits for cutting and puncturing the container extending through the top of the container and having its outlet end in the upper portion thereof.

9. The apparatus combination as in claim 8, wherein gaskets are peripherally fitted over said cutting and puncturing conduit in proximity to the under surface of said lid-plate, and in proximity to the conduit connections with the container when said lid-plate is in position for locking and clamping said container relative to said base member, said gaskets being adapted for sealing said connections under the pressure conditions prevailing within the container.

10. The apparatus combination as in claim 9, wherein the locking and clamping means comprises said pivotally mounted plate means, a bell crank lever pivotally attached to said frame means at a point approximate the angle determined by the respective portions of said bell crank lever, one of said angularly disposed portions being pivotally coordinated with a turnbuckle means, said turnbuckle means being pivotally attached to the upper surface of said plate means.

11. The apparatus combination as in claim 7, wherein the locking and clamping means comprises said pivotally mounted plate means, a lever member pivotally attached to said frame means at a point thereon below the substantially horizontal locking and clamping position of said plate means and opposed to the point of pivotal mounting thereof, and a wire loop means pivotally attached at one end to said lever member and at its other end to the upper surface of a projecting portion of said plate means.

12. In an apparatus combination, a supporting structure comprising a base and a substantially vertically directed member attached thereto, a main flow conduit affixed to said structure and adapted for the passage of a liquid stream therethrough, a flow restricting means within said main conduit for effecting a pressure differential affording relatively high and low pressure areas within said main conduit during the passage of the stream therethrough, a clamping means comprising a plate element pivotally mounted on said vertically directed member at a distance spaced apart from the base and adapted for the retention of a container between said plate element and said base, means attached to said supporting structure adapted for locking the said plate element in a superimposed position relative to any said container positionable on said base and for releasing the plate from its locked position, and conduits respectively connected with a high pressure area and a low pressure area of said main flow conduit, said conduits being affixed to the said plate element and extending therethrough, said conduits being provided with gaskets adapted for effecting a leak-proof correlation of said conduits with any container openings through which they may extend when any said container is retained by the said plate element in locked position on the base.

13. An apparatus as in claim 12, wherein the conduits affixed to and extending through the plate element are adapted to puncture the surface of a sealed, puncturable container for extending into the same when the plate element is in locked position relative to a container on the base.

14. An apparatus combination which comprises a supporting base member and a frame member coordinated therewith, a main flow conduit integral with said base member and adapted for the passage of a liquid stream therethrough, a flow restricting means within said conduit for effecting a pressure differential in the flow of said stream and affording relatively high and low pressure areas in said main conduit during the passage of the stream therethrough, a locking and clamping means comprising a plate means pivotally mounted on said frame member at a distance from the base member adapted for the retention of a container between said plate means and said base member, means attached to and adapted for rotating the said plate means to a position for locking and clamping a said container relative to said base member and for releasing the said plate means from its locking and clamping position, and conduits integrally attached to said plate means, said conduits being adapted for cutting and puncturing a puncturable container during the rotation of the said plate means to its locking and clamping position relative to said container.

References Cited in the file of this patent

UNITED STATES PATENTS

| | | |
|---|---|---|
| 618,349 | Heany | Jan. 24, 1899 |
| 811,749 | Somers | Feb. 6, 1906 |
| 846,100 | Estep | Mar. 5, 1907 |
| 1,029,718 | Rohrbacher | June 18, 1912 |
| 1,032,879 | Carlton | July 16, 1912 |
| 1,085,348 | Ledoux | Jan. 27, 1914 |
| 1,104,035 | Chellew | July 21, 1914 |
| 1,406,903 | Rose | Feb. 14, 1922 |
| 1,458,975 | Clauson | June 19, 1923 |
| 1,611,406 | Bell | Dec. 21, 1926 |
| 1,639,870 | Valsig | Aug. 23, 1927 |
| 1,923,266 | Houpert | Aug. 22, 1933 |
| 1,961,583 | Hamer | June 5, 1934 |
| 1,988,000 | Estler | Jan. 15, 1935 |
| 2,135,969 | Donaldson | Nov. 8, 1938 |
| 2,356,286 | Timpson | Aug. 22, 1944 |
| 2,388,097 | Turner | Oct. 30, 1945 |
| 2,421,183 | Cakebread | May 27, 1947 |